(12) United States Patent
Kong et al.

(10) Patent No.: US 9,719,460 B2
(45) Date of Patent: Aug. 1, 2017

(54) ENGINE OIL PAN

(71) Applicant: SUZHOU CLEVA PRECISION MACHINERY & TECHNOLOGY CO., LTD, Suzhou (CN)

(72) Inventors: Zhao Kong, Suzhou (CN); Ning Guo, Suzhou (CN); Gan Chen, Suzhou (CN); Keya Feng, Suzhou (CN)

(73) Assignee: SUZHOU CLEVA PRECISION MACHINERY & TECHNOLOGY CO., LTD., Suzhou (CN)

( * ) Notice: Subject to any disclaimer, the term of this patent is extended or adjusted under 35 U.S.C. 154(b) by 138 days.

(21) Appl. No.: 14/568,132

(22) Filed: Dec. 12, 2014

(65) Prior Publication Data
US 2015/0096527 A1 Apr. 9, 2015

Related U.S. Application Data

(63) Continuation of application No. PCT/CN2013/000618, filed on May 27, 2013.

(30) Foreign Application Priority Data

Jun. 15, 2012 (CN) .......................... 2012 1 0198803

(51) Int. Cl.
| F02F 7/00 | (2006.01) |
| F01M 11/06 | (2006.01) |
| F01M 1/04 | (2006.01) |
| F01M 13/04 | (2006.01) |
| F16N 7/32 | (2006.01) |
| F02B 63/02 | (2006.01) |

(Continued)

(52) U.S. Cl.
CPC ............. *F02F 7/0021* (2013.01); *F01M 1/04* (2013.01); *F01M 11/00* (2013.01); *F01M 11/065* (2013.01); *F01M 13/0416* (2013.01); *F16N 7/32* (2013.01); *F01M 2011/007* (2013.01); *F01M 2013/0044* (2013.01); *F02B 63/02* (2013.01)

(58) Field of Classification Search
CPC ................... F02F 7/0021; F01M 11/00; F01M 2011/0033; F01M 2011/0037; F01M 2011/0041; F01M 2011/005; F01M 1/04; F01M 11/065; F01M 13/0416; F01M 11/067; F16N 7/32
See application file for complete search history.

(56) References Cited

U.S. PATENT DOCUMENTS

2009/0020367 A1* 1/2009 Kawashima ....... F01M 11/0004
184/106

* cited by examiner

*Primary Examiner* — Jacob Amick
(74) *Attorney, Agent, or Firm* — Perkins Coie LLP

(57) ABSTRACT

The present invention discloses an engine oil pan, which includes a cylinder block, wherein a plurality of arc-shaped grooves are disposed on the second end surface of the cylinder block along the axial direction of a crank shaft; the arc-shaped grooves form arc-shaped bulges in a sunk portion on the first end surface of the cylinder block; the arc-shaped bulges divide the sunk portion into first space and second space; a platform is disposed inside the sunk portion of the cylinder block; and the height of the platform is lower than the height of the arc-shaped bulges. The technical solution employed by the present invention enables lubricating oil in the engine oil pan to flow more effectively, and enables the lubricating oil in the oil pan to be utilized more effectively when the engine is used in any position.

6 Claims, 14 Drawing Sheets

(51) Int. Cl.
*F01M 11/00* (2006.01)
*F01M 13/00* (2006.01)

ENGINE OIL PAN

CROSS REFERENCE TO RELATED APPLICATIONS

This application is a continuation of PCT/CN2013/000618 filed May 27, 2013, which claims priority to CN 201210198803.3 filed Jun. 15, 2012, both of which are incorporated by reference.

TECHNICAL FIELD

The present invention relates to an engine oil pan, and in particular, to an oil pan used for storing lubricating oil.

BACKGROUND ART

Like a hand-held mower (shears) and a knapsack operation machine targeted to vert, conventional two-stroke and four-stroke small-size general engines have been widely used as engines of the operation machines that drive operating personnel to hold by hands or bear on the back for operation. In order to ensure the normal operation of the engine, it needs to be lubricated by lubricating oil. The four-stroke engine is usually equipped with an oil pan for storing the lubricating oil. Because the engine may be possibly used in different states, for example, used in an inverted or leant manner, the lubricating oil in the oil pan may be possibly accumulated in any position of the oil pan. Therefore, the structure of the oil pan plays a very important role on whether the lubricating oil in the oil pan can be sufficiently used.

In the prior art, arc-shaped bulges will be formed in the oil pans of some engines due to the factors of structure and processing. When the engine is used in an upright manner, the arc-shaped bulges will not affect the flowing of the lubricating oil. However, when the engine is used in a leant or inverted manner, the arc-shaped bulges will affect the flowing of the lubricating oil in the oil pan, thus causing insufficient utilization of the lubricating oil.

SUMMARY OF THE INVENTION

The present invention provides an engine oil pan, which can ensure lubricating oil in an oil pan to be sufficiently utilized to ensure the normal operation of an engine lubricating system when the engine is in various use gestures, wherein the technical solution is as follows.

An engine oil pan includes a cylinder block, wherein a plurality of arc-shaped grooves are disposed on the second end surface of the cylinder block along the axial direction of a crank shaft. The arc-shaped grooves form arc-shaped bulges in a sunk portion on the first end surface of the cylinder block. The arc-shaped bulges divide the sunk portion into first space and second space. A platform is disposed inside the sunk portion of the cylinder block. The height of the platform is lower than the height of the arc-shaped bulges.

Preferably, the second end surface is provided with steps at the platform.

Preferably, the step is higher than the lowest end of the arc-shaped groove.

Preferably, the platform is located at the tail end of the processing direction of the arc-shaped groove.

Preferably, the platform is located on the axial direction of the crank shaft, and is symmetric around the axis of the crank shaft.

Preferably, the arc-shaped grooves and the arc-shaped bulges are symmetric around the axis of the crank shaft.

Preferably, the oil pan comprises the cylinder block and a lower cover.

The technical solution employed by the present invention enables lubricating oil in the engine oil pan to flow more effectively, and enables the lubricating oil in the oil pan to be utilized more effectively when the engine is used in any position.

DETAILED DESCRIPTION OF THE PREFERRED EMBODIMENTS

The present invention will be further described hereinafter with reference to the specific embodiments.

Figure 1:
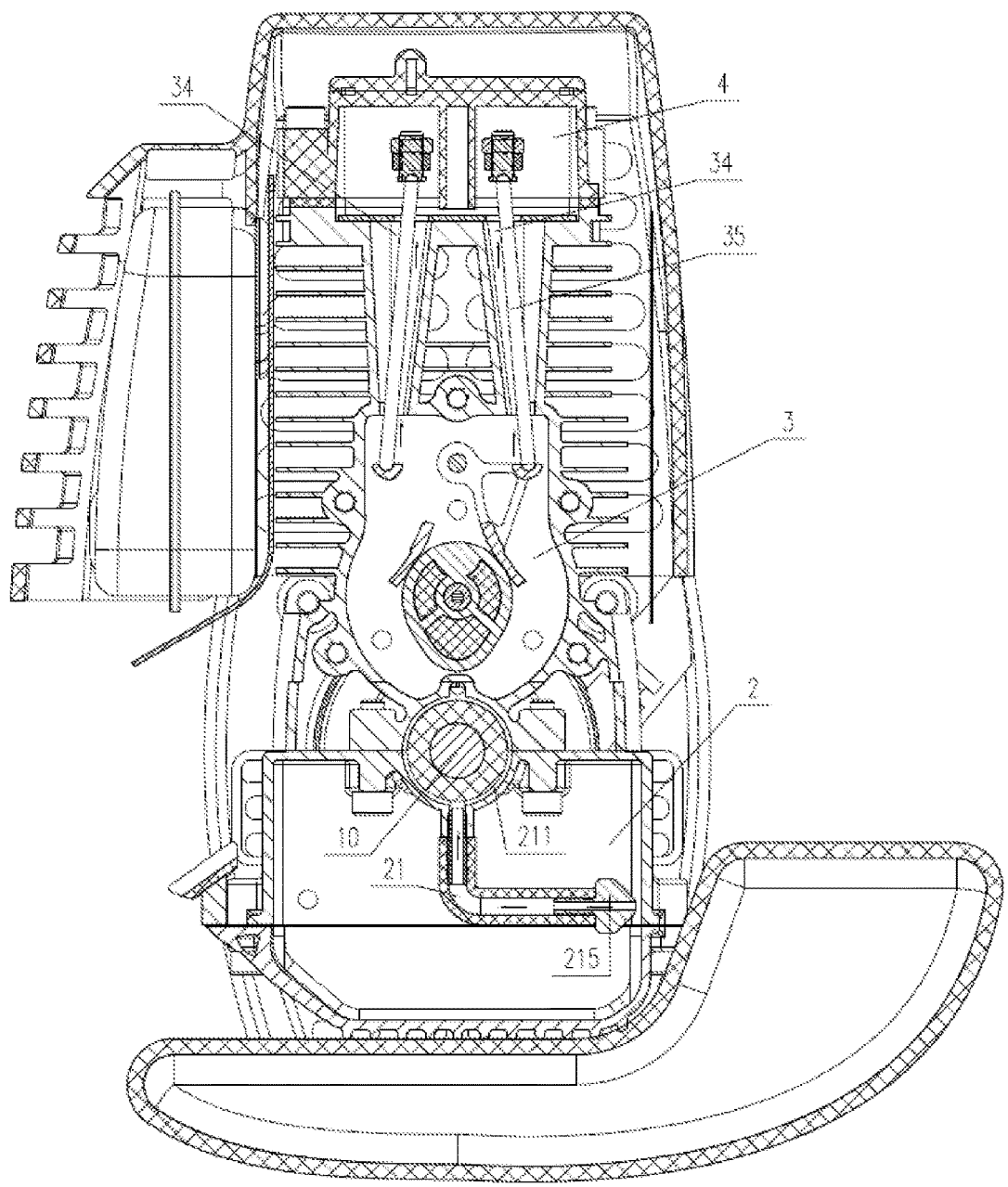
FIG. 1 is a cross-sectional view of an engine of an embodiment of the present invention.
Figure 2:
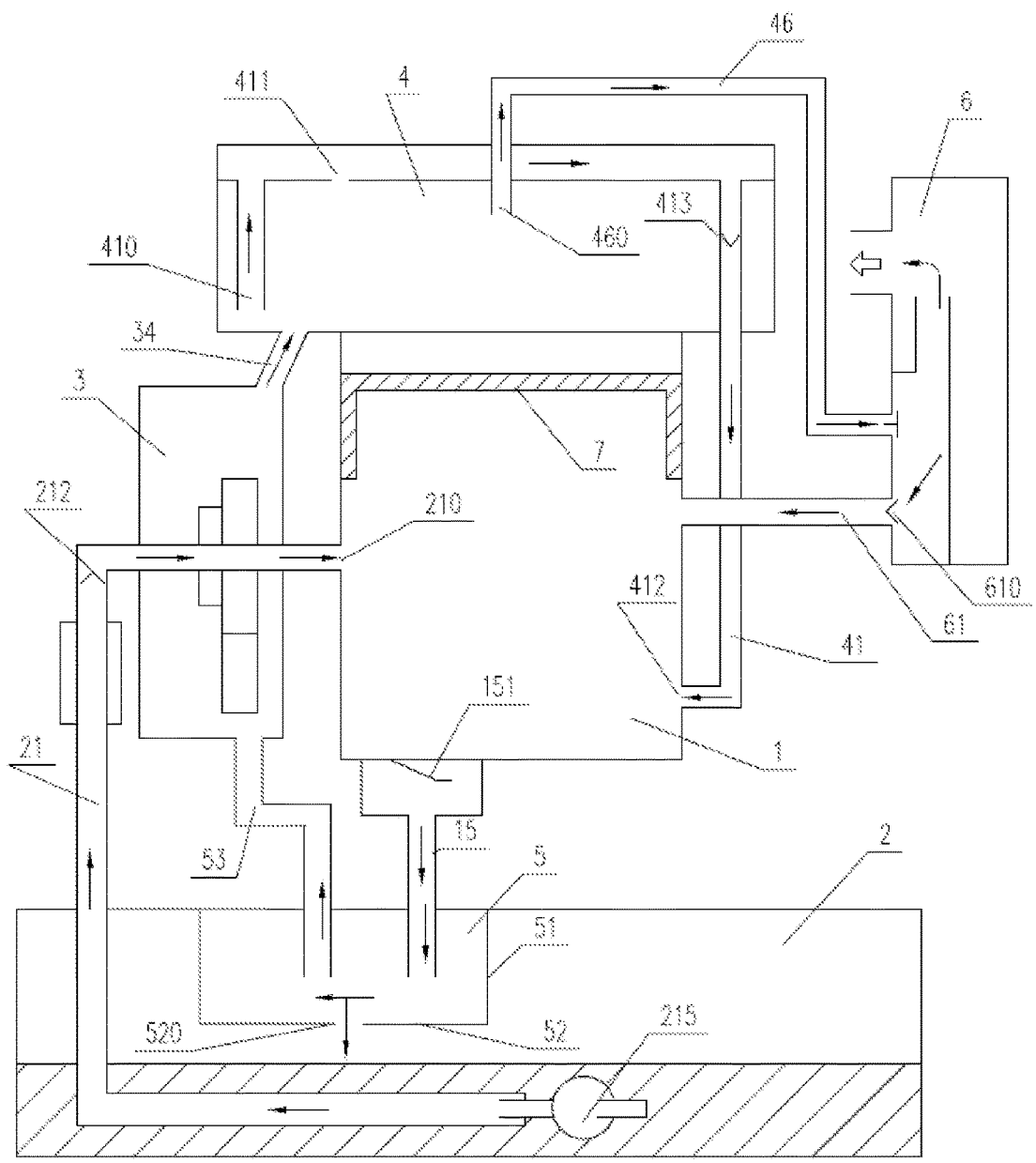
FIG. 2 is a schematic view of an engine lubricating system of the embodiment of the present invention.
Figure 3:
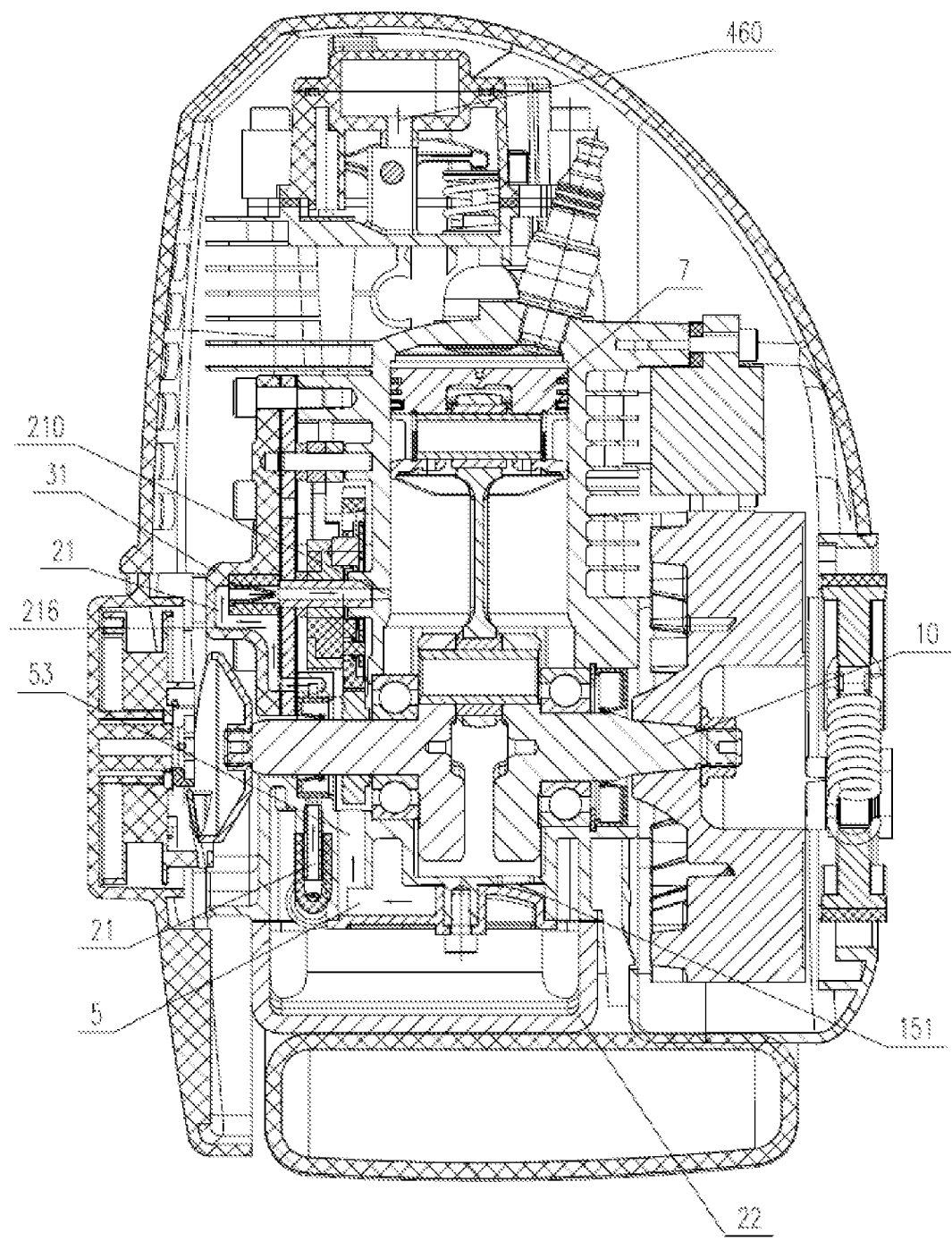
FIG. 3 is a cross-sectional view of the engine of the embodiment of the present invention.
Figure 4:
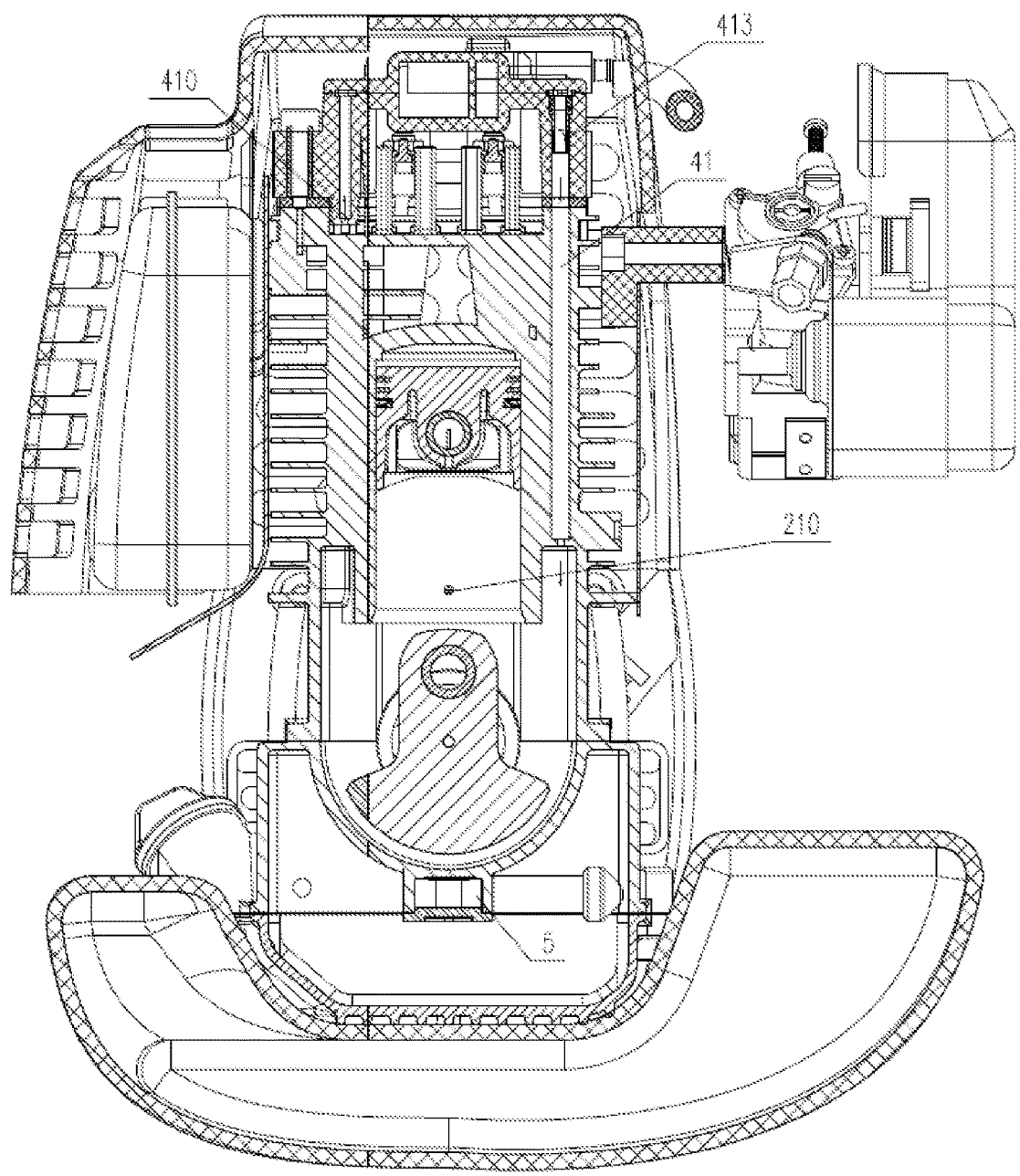
FIG. 4 is a cross-sectional view of the engine of the embodiment of the present invention.
Figure 5:
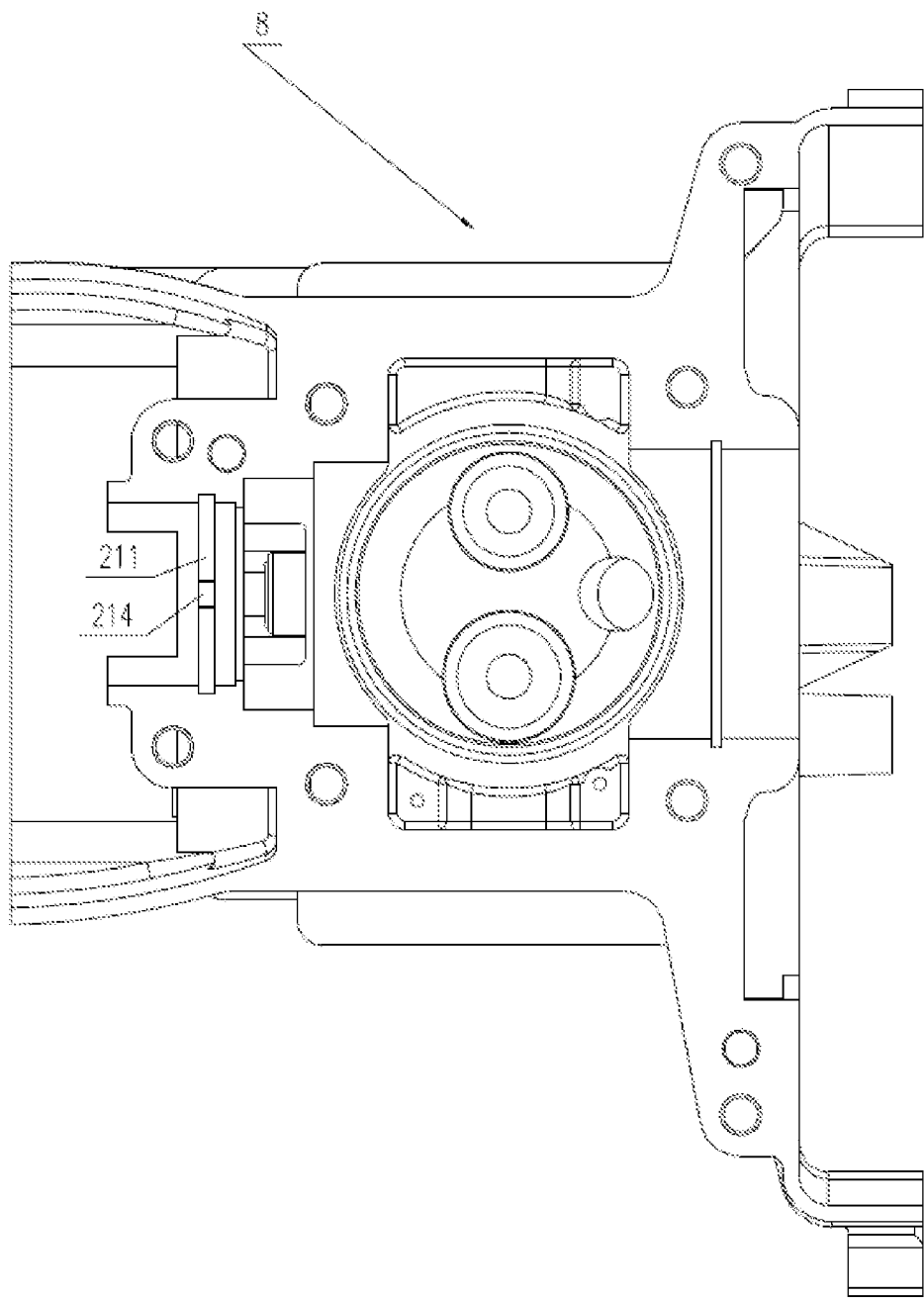
FIG. 5 is a vertical view of a cylinder of the embodiment of the present invention.
Figure 6:
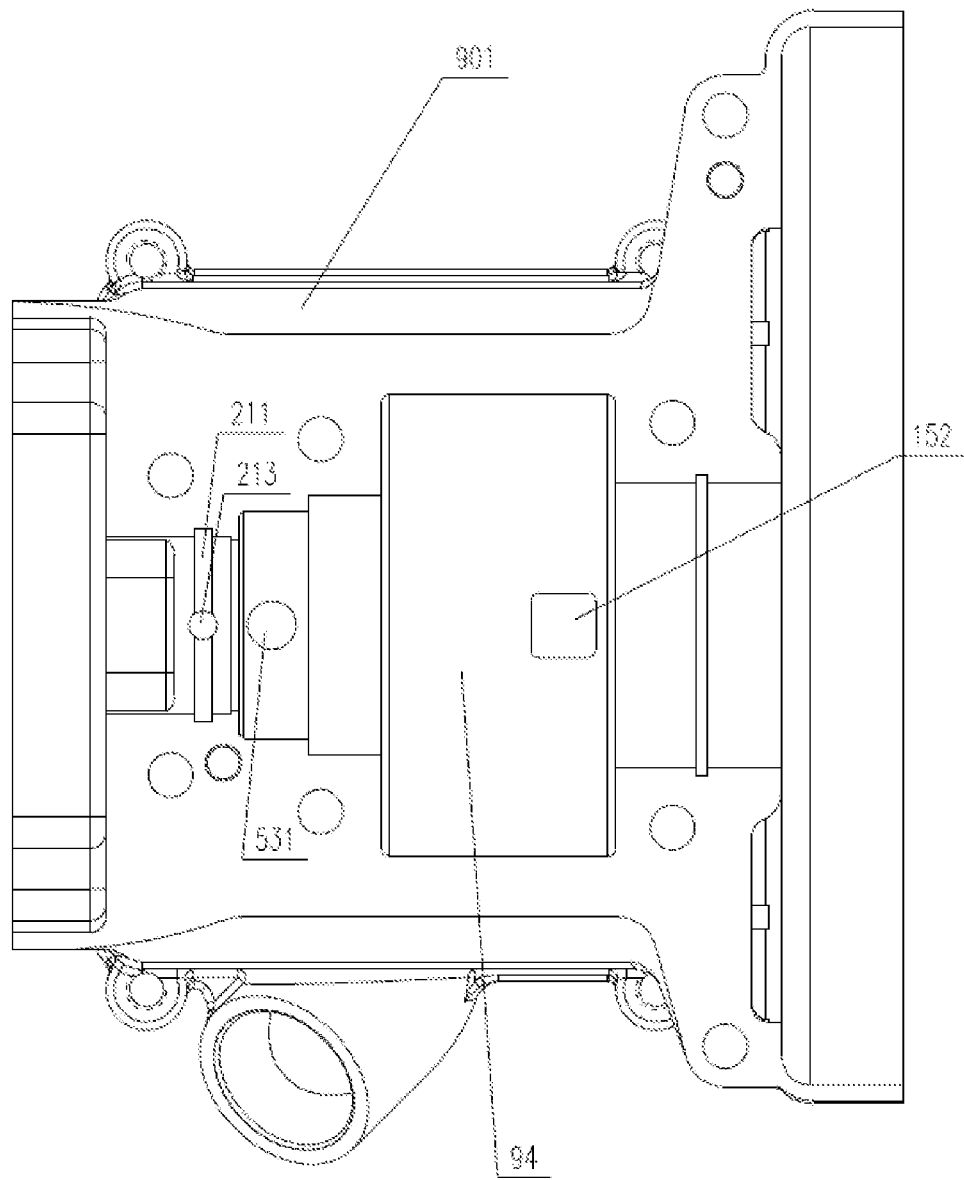
FIG. 6 is a top view of the cylinder of the embodiment of the present invention.
Figure 8:
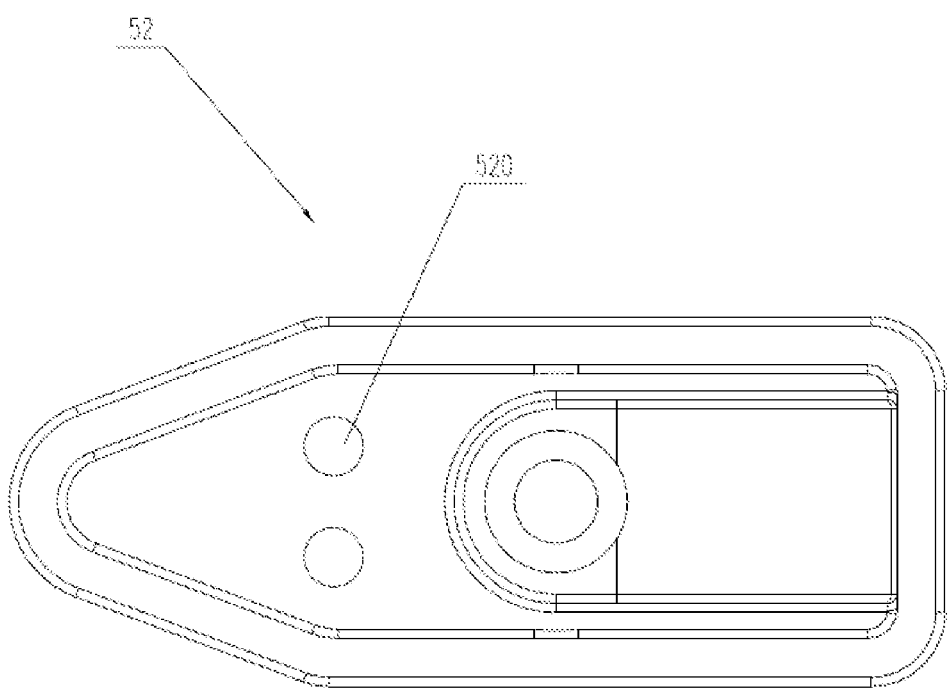
FIG. 8 is a schematic view of a bottom cover of a distribution chamber of the embodiment of the present invention.

A lubricating system for an engine according to a preferred embodiment of the present invention is as shown in the figure. FIGS. 1-4 show an engine which is vertically disposed, including a crankcase 1, an oil pan 2, a cam box 3, a rocker chamber 4 and an air filter 6. The oil pan 2 is used for storing lubricating oil. The crankcase 1 is disposed above the oil pan 2. A crank shaft 10 is disposed in the crankcase 1 and is jointed with a piston 7 in a cylinder 8. The motion of the piston 7 in the cylinder 8 causes pressure change in the crankcase 1. The oil pan 2 and the crankcase 1 are communicated through an oil supply passage 21. One end of the oil supply passage 21 is provided with an oil suction portion 215. When proper lubricating oil is provided in the oil pan 2, the oil suction portion 215 can be always kept below a lubricating oil level when the engine is leant or inverted, so that the oil suction portion is ensured to suck oil from the oil pan 2. The other end of the oil supply passage 21 is an oil nozzle 210. The oil nozzle 210 is disposed below the side wall of the cylinder 8 and the bottom dead centre of the piston 7. That is, the up-and-down motion of the piston 7 cannot shield the oil nozzle 210. The oil nozzle 210 is always in an opening state. The lubricating oil sucked from the oil pan 2 is sprayed into the crankcase 1 through the oil nozzle 210. The oil supply passage 21 includes an annual passage 211. As shown in FIG. 1, FIG. 5 and FIG. 6, the annual passage 211 is respectively spliced by recesses disposed on the cylinder 8 and a cylinder block 9. An upper groove hole 214 is disposed on the recess of the annual passage 211 on the cylinder 8. A lower groove hole 213 is disposed on the recess of the annual passage 211 on the cylinder block 9. The oil in the oil supply passage 21 enters the annual passage 211 through the lower groove hole 213, flows to the upper groove hole 214 along the annual passage. The lubricating oil flows from the upper groove hole 214 into a cam cover passage 216. The cam cover passage 216 is a portion of the oil supply passage 21. The cam cover passage 216 is disposed on a cam box cover 31 (as shown in FIG. 3). The oil supply passage 21 is further provided with a first one-way valve 212. The first one-way valve 212 is opened when the inside of the crankcase 1 is under negative pressure, and is closed when the inside of the crankcase 1 is under positive pressure. The one-way valve in the embodiment refers to a control valve which can control to open and close the passages. A distribution chamber 5 is disposed above the oil pan 2. The distribution chamber is an independent cavity. In the embodiment, the distribution chamber is disposed at the bottom of the cylinder block 9. The distribution chamber may be disposed in other part of the engine according to the change of structure of the engine. The distribution chamber includes a wall 51 and a bottom cover 52 (As shown in FIG. 8). The wall 51 is formed by downwards extending from the bottom of the cylinder block 9. The bottom cover 52 is fixed at the bottom of the distribution chamber. An oil return hole 520 is disposed on the bottom cover 52 and is approximately round. Preferably, two oil return holes 520 are disposed in the embodiment. The quantity, size and shape of the oil return hole 520 can be changed differently according to different efficiency and structure demands on the engine. Oil & gas after entering the distribution chamber 5 collides with the parts in the distribution chamber 5, for example, collides with the wall 51 and the bottom cover 52, so that partial oil & gas is liquefied. Liquid lubricating oil enters the oil pan 2 through the oil return hole 520, and the rest oil & gas enters a second oil conveying passage 53 through an air outlet hole 531 to lubricate the cam box 3. Therefore, the distribution chamber 5 can effectively reduce the concentration of the oil & gas entering the cam box 3. The crankcase 1 and the distribution chamber 5 are communicated through a first oil conveying passage 15. The first oil conveying passage 15 is provided with a second one-way valve 151. Preferably, the second one-way valve is a leaf valve. The reed valve includes deformable tinsel. When the inside of the crankcase is under negative pressure, the second one-way valve 151 is closed. When the inside of the crankcase is under positive pressure, the second one-way valve 151 is opened. The distribution chamber 5 and the cam box 3 are communicated through the second oil conveying passage 53. The cam box 3 is located above the distribution chamber 51 and besides the cylinder 8. A cam mechanism is disposed in the cam box 3 to control the opening and closing of an air valve. The top of the cylinder 8 is provided with the rocker chamber 4. The cam box 3 and the rocker chamber 4 are communicated through a third oil conveying passage 34. In the embodiment, the third oil conveying passage 34 is a passage (as shown in FIG. 1) surrounding a tappet 35; therefore, two third oil conveying passages are disposed. The rocker chamber 4 and the crankcase 1 are communicated (as shown in FIG. 4) through an oil return passage 41. The oil return passage 41 is provided with a top hole 411 (as shown in FIG. 2) and a bottom hole 410. The bottom hole 410 is located at the end portion of the oil return passage 41 extending towards the inside of the rocker chamber 4. When the engine is in a state of use, lubricating oil will be accumulated in the rocker chamber 4. When the engine is used in a vertical direction, the lubricating oil is accumulated at the bottom of the rocker chamber 4. When the lubricating oil level is higher than the bottom hole 410, the lubricating oil is sucked away from the bottom hole 410 through the oil return passage 41, so that the lubricating oil in the rocker chamber 4 will not be excessive. The top hole 411 is located at the top of the rocker chamber 4. When the engine is in an inverted state, the lubricating oil is accumulated in the top of the rocker chamber 4. When the lubricating oil level is higher than the top hole 411, the lubricating oil is sucked away from the top hole 411 through the oil return passage 41. The oil return passage 41 is provided with an oil return opening 412 on the cylinder 8. The oil return opening 412 is located below the bottom dead centre of the piston. That is, the oil return opening 412 is always in an opening state, and the motion path of the piston may not pass through the oil return opening 412. The oil return passage 41 is also provided with a third one-way valve 413. When the inside of the crankcase 1 is under negative pressure, the third one-way valve 413 is opened. When the inside of the crankcase 1 is under positive pressure, the third one-way valve 413 is closed. The rocker chamber 4 and the air filter 6 are communicated through an air course 46. The opening end of the air course 46 is disposed in the middle of the rocker chamber 4. Blow-by gas produced during circulation of the lubricating oil passes through the air course 46 through the open end 460 and is exhausted to the inlet of a carburettor inlet on the air filter 6.

A flowing path for the lubricating oil in the lubricating system of the embodiment is as shown in FIG. 2. The up-and-down motion of the piston 7 causes periodical change of the pressure in the crankcase 1 and causes pressure difference generated in each part of the engine. The lubricating oil having pressure difference flows along a certain path. The pressure of the crankcase 1 is P1. The pressure of the oil pan 2 is P2. The pressure of the cam box 3 is P3. The pressure of the rocker chamber 4 is P4. The pressure of the distribution chamber 5 is P5. The atmospheric pressure is P0. When the piston 7 moves from the bottom dead centre to the upper dead center, the pressure in the crankcase 1 is reduced to produce negative pressure. At this time, the relationship of the pressure of each part is P5>P3>P4>P2>P0>P1. The first one-way valve 212, the third one-way valve 413 and a fourth one-way valve 610 are opened. Meanwhile, the second one-way valve 151 is closed. At this time, the lubricating oil in the oil pan 2 enters the crankcase 1 through the oil supply passage 21. The lubricating oil in the rocker chamber 4 enters the crankcase 1 through the oil return passage 41. The lubricating oil in the air filter 6 enters the crankcase 1 through an oil returning passage 61. The lubricating oil entering the crankcase is beat into mist shape by a crank shaft component to lubricate the parts in the entire crankcase. When the piston moves from the upper dead center to the bottom dead centre, the pressure in the crankcase 1 is increased to produce positive pressure. At this time, the relationship of the pressure is P1>P5>P3>P4>P2>P0. The first one-way valve 212, the third one-way valve 413 and the fourth one-way valve 610 are closed. The second one-way valve 151 is opened. At this time, the oil mist in the crankcase 1 passes through the first oil conveying passage 15 through an air inlet 152 and enters the distribution chamber 5. The pressure in the distribution chamber 5 is increased. Meanwhile, in the distribution chamber 5, the oil mist collides with the wall 51, the bottom cover 52 and the like in the distribution chamber 5, so that partial oil mist becomes liquid oil, and the liquid oil enters the oil pan through the oil return hole 520. The remaining oil mist passes through the second oil conveying passage 53 through the air outlet hole 531 and enters the cam box 3 to lubricate the parts in the cam box 3. The oil mist continuously enters the rocker chamber 4 from the cam box 3 through the third oil conveying passage 34 to lubricate the parts in the rocker chamber 4. The lubricating oil in the rocker chamber 4 enters the oil return passage 41 through the bottom hole 411 or the top hole 410, and then returns to the crankcase 1. Partial oil mist and blow-by gas in the rocker chamber 4 pass through the air course 46 and enter the air filter 6. The air filter 6 separates the lubricating oil and the blow-by gas through oil & gas separation. The embodiment utilizes the change of pressure in the crankcase 1 to cause pressure difference produced in each part, so that the lubricating oil flows in the engine along a certain lubricating passage. However, the present invention is also applied to a four-stroke engine which depends on an oil pump for oil supply.

Figure 9:
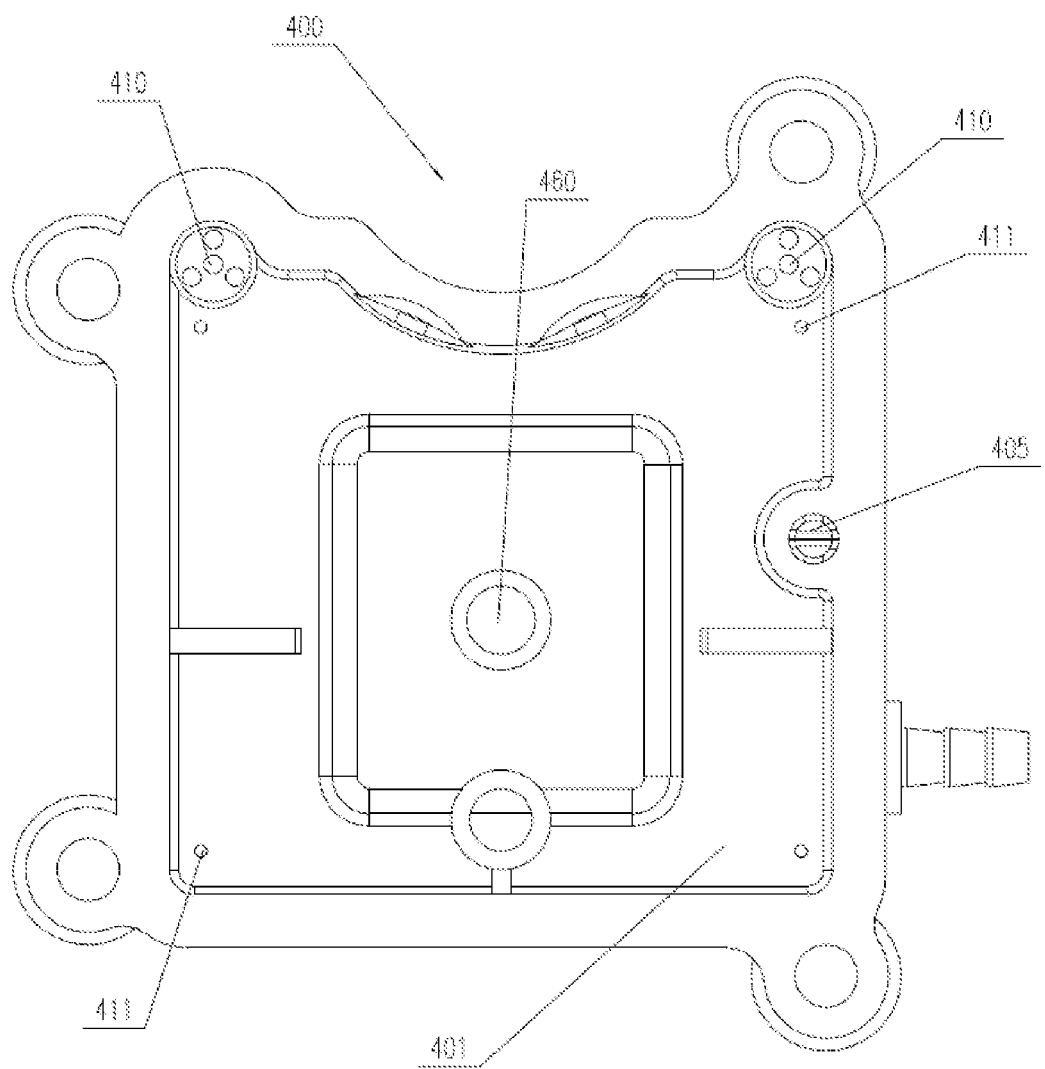
FIG. 9 is a vertical view of a rocker chamber cover of the embodiment of the present invention.
Figure 10:
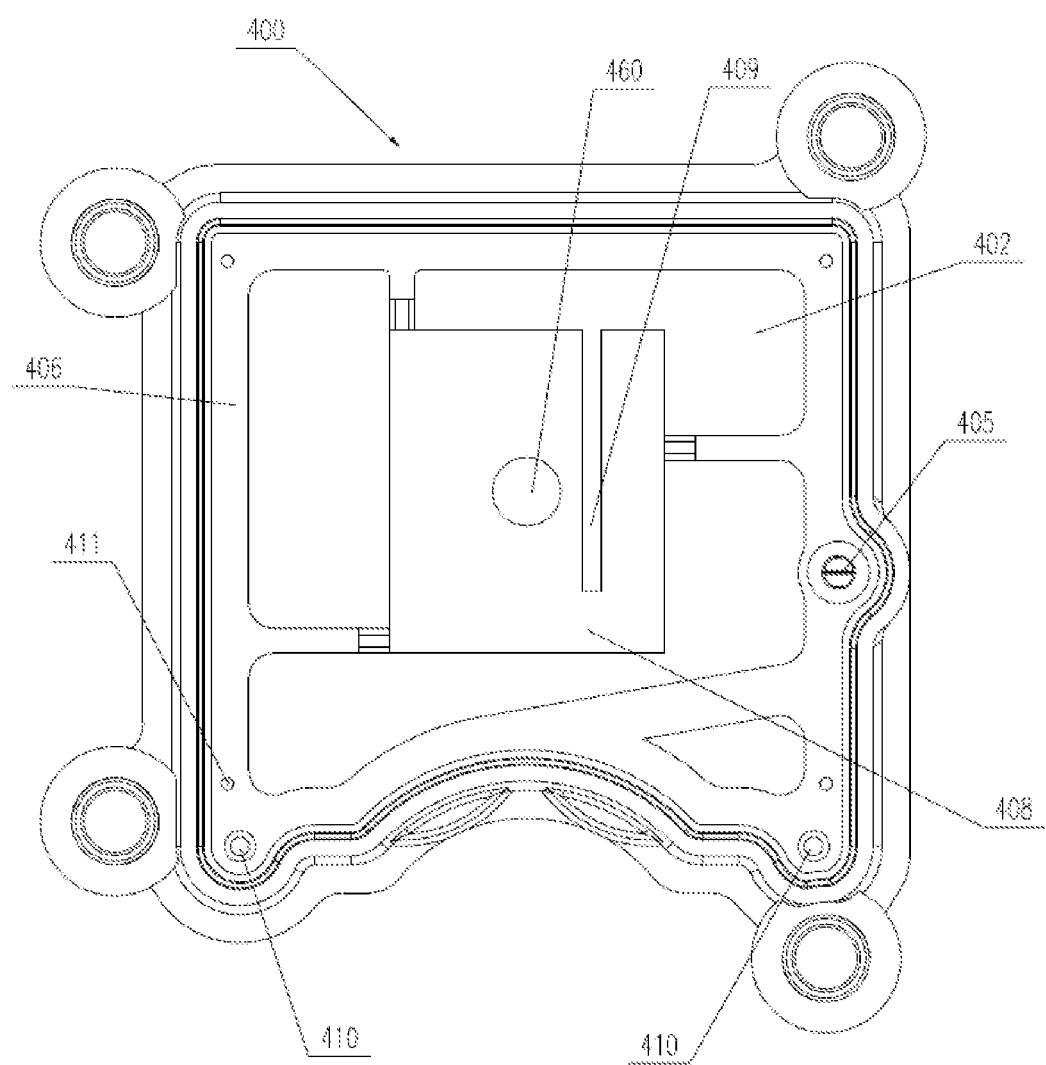
FIG. 10 is a top view of the rocker chamber cover of the embodiment of the present invention.
Figure 11:
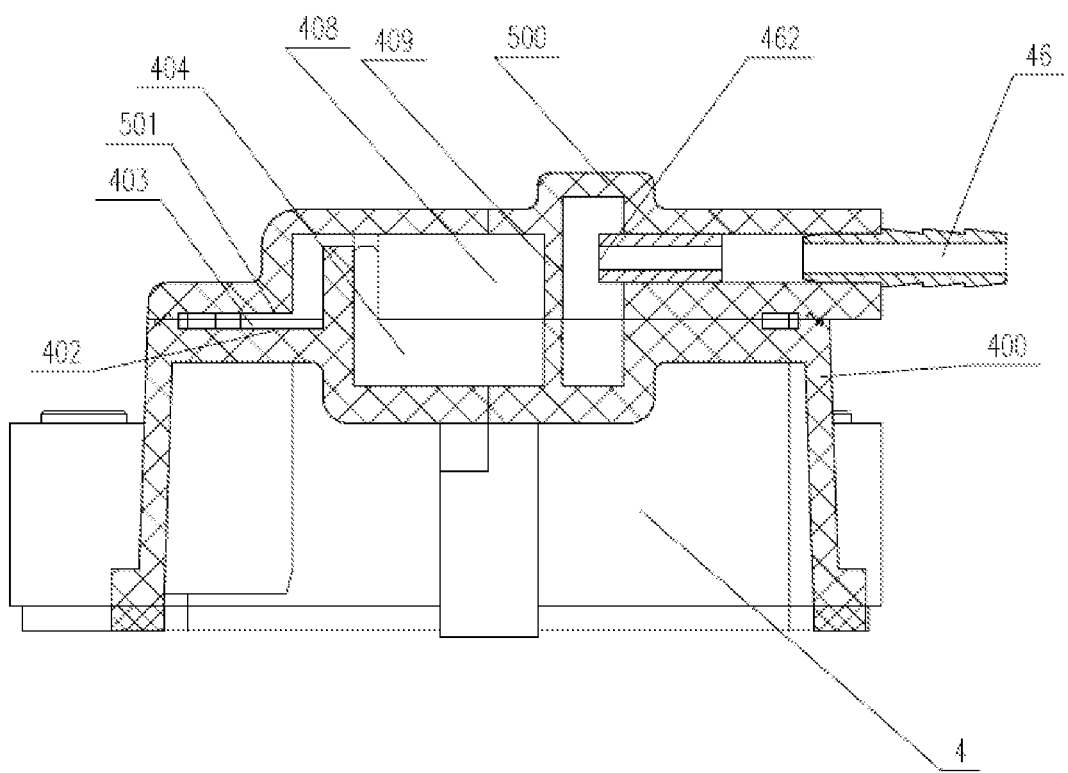
FIG. 11 is a top cross-sectional view of the cylinder of the embodiment of the present invention.
Figure 12:
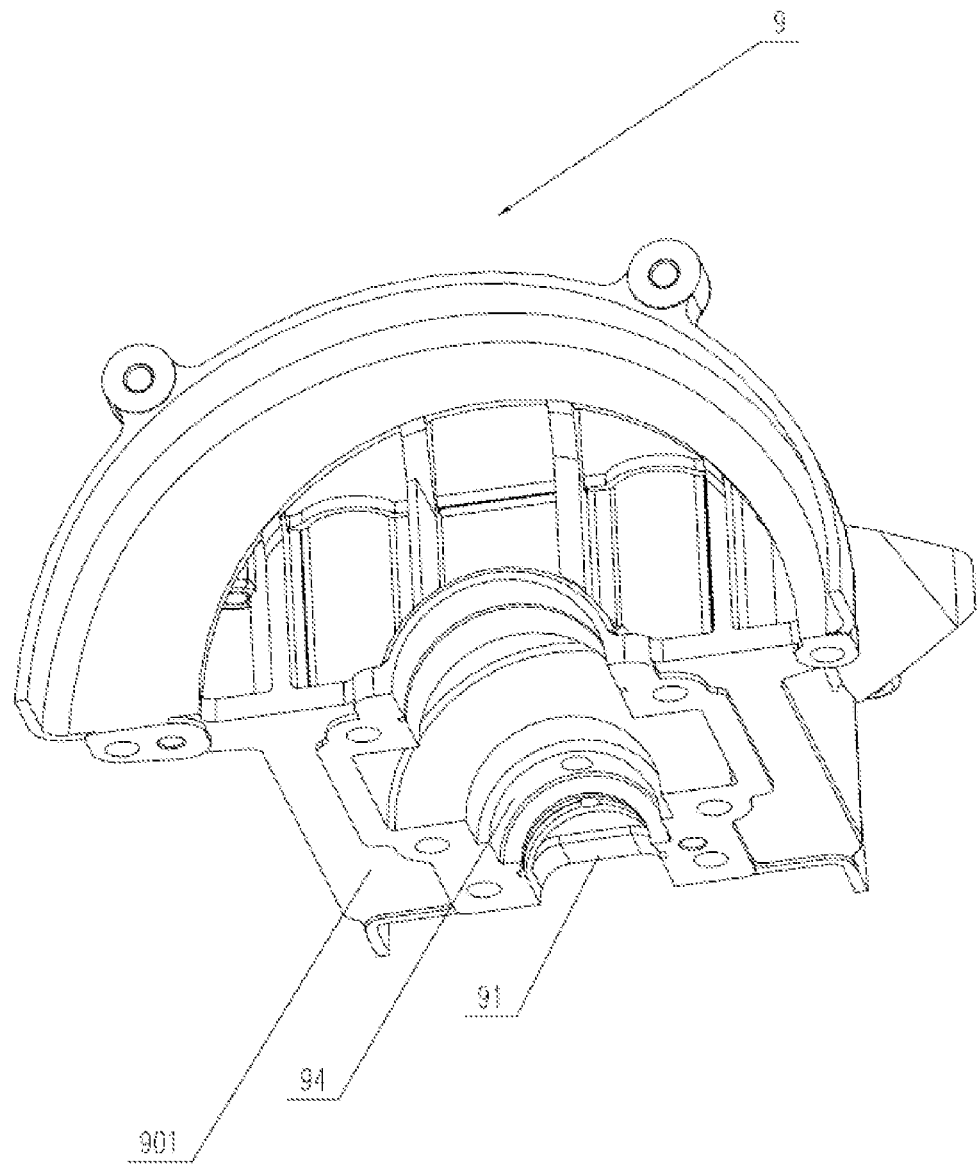
FIG. 12 is a perspective view of the cylinder block of the embodiment of the present invention.
Figure 13:
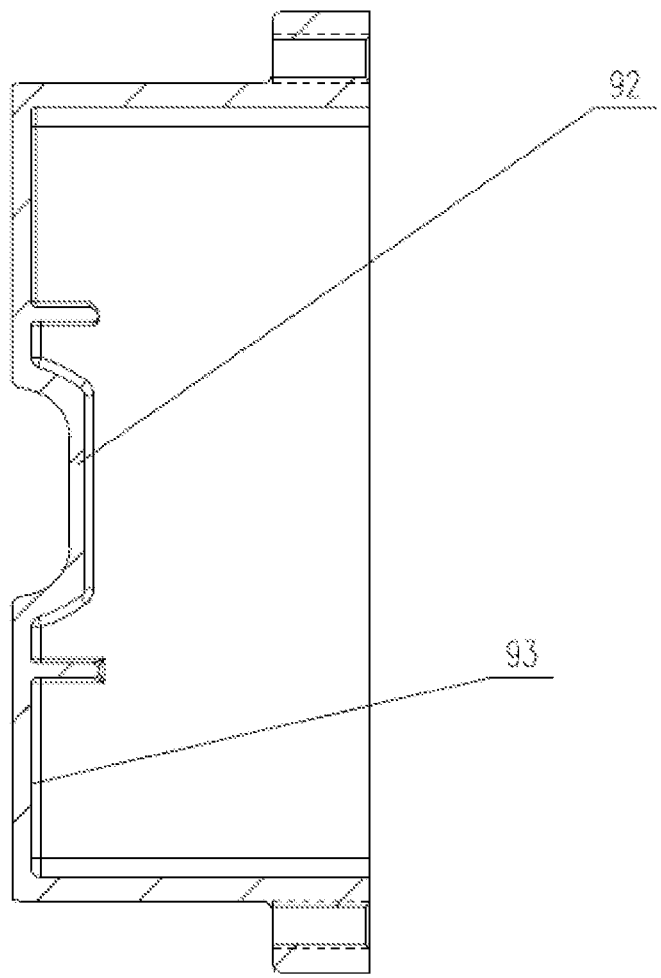
FIG. 13 is a schematic view of an A-A section of FIG. 7.
Figure 14:
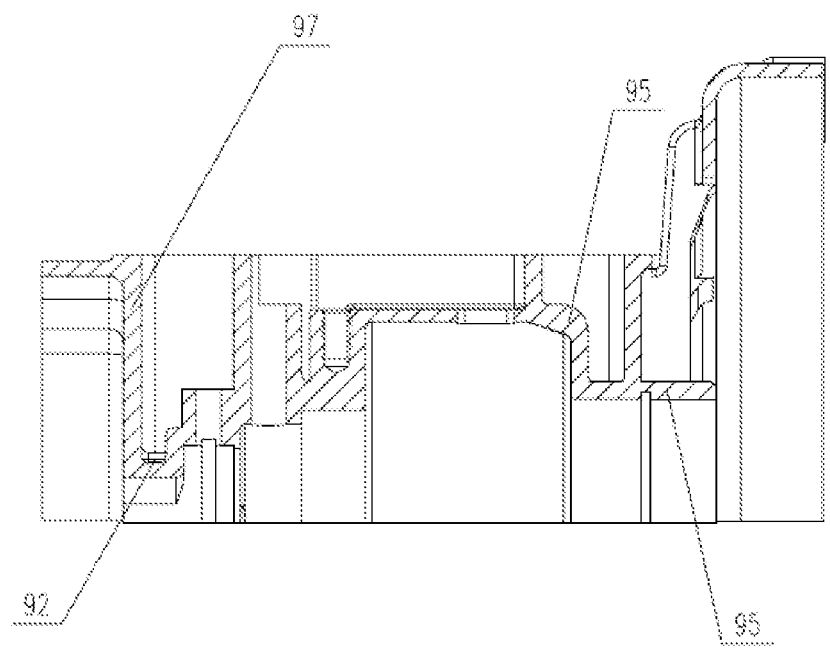
FIG. 14 is a schematic view of a B-B section of FIG. 7.

FIGS. 9-11 show a rocker chamber cover of the engine of the embodiment. The rocker chamber cover 400 is disposed at the top of the rocker chamber 4. Oil holes are disposed on the rocker chamber cover 400. In the embodiment, the oil holes refer to the bottom hole 410, the top hole 411 and an oil return hole 405. Preferably, two bottom holes are disposed as the bottom holes 410 of the oil return passage. Four top holes 411 are disposed at the four corners of the upper wall 401 of the rocker chamber cover 400. When the engine is in an inverted state, at least one top hole 411 can be ensured to be below the lubricating oil level no matter the engine is leant to any direction. The middle of a cylinder cover 400 is provided with an opening end 460. The mixed gas formed by the oil mist and blow-by gas in the rocker chamber leaves the rocker chamber through the opening end 460. As shown in FIG. 10 and FIG. 11, a separation cavity 408 and a connection channel 403 are disposed between the outer wall 402 of the rocker chamber cover and the lower wall 501 of the cover plate. The separation cavity and the connection channel are spliced by the rocker chamber cover 400 and a cover plate 500. The connection channel 403 includes a groove 406. The groove 406 is formed by sunk portions on the outer wall 402 of the rocker chamber cover and the lower wall 501 of the cover plate. Surely, the groove can also be formed even if the suck portion is disposed on only one of the rocker chamber cover and the cover plate. The connection channel 403 is distributed on a plane vertical to the piston. The bottom hole 410, the top hole 411, the oil return hole 405 and the separation cavity 408 are communicated by the connection channel 403. The bottom hole 410 and the top hole 411 suck the lubricating oil from the inside of the rocker chamber 4 to the outside of the rocker chamber. The lubricating oil flows into the oil return hole 405 along the groove 406 on the outer wall 402 and then flows into the crankcase 1. The connection channel formed by the rocker chamber cover and the cover plate to convey lubricating oil simplifies an oilway structure on the top of the rocker chamber and sufficiently utilizes the space of the rocker chamber cover. The middle of the outer wall 402 is provided with the separation cavity 408. The separation cavity 408 comprises a notch 404 on the outer wall 402 and the cover plate 500, and is approximately square. A filtering material (not shown in the figure), for example a metal gauze, is disposed in the separation cavity 408. The filtering material separates the mixed gas entering the separation cavity 408 from the opening end 460 into gas and oil liquid, thus decreasing the concentration of the oil mist in the mixed gas, reducing the consumption of the lubricating oil, and being capable of reducing emission. The separated gas leaves the separation cavity 408 through a cover hole 462 and flows towards the air filter 6. A baffle 409 is also disposed in the separation cavity 408. The baffle is formed by the bulging of the inner wall of the separation cavity. The baffle 409 extends the flowing path of the mixed gas in the separation cavity 408, thus enhancing the separation effect.

Figure 7:
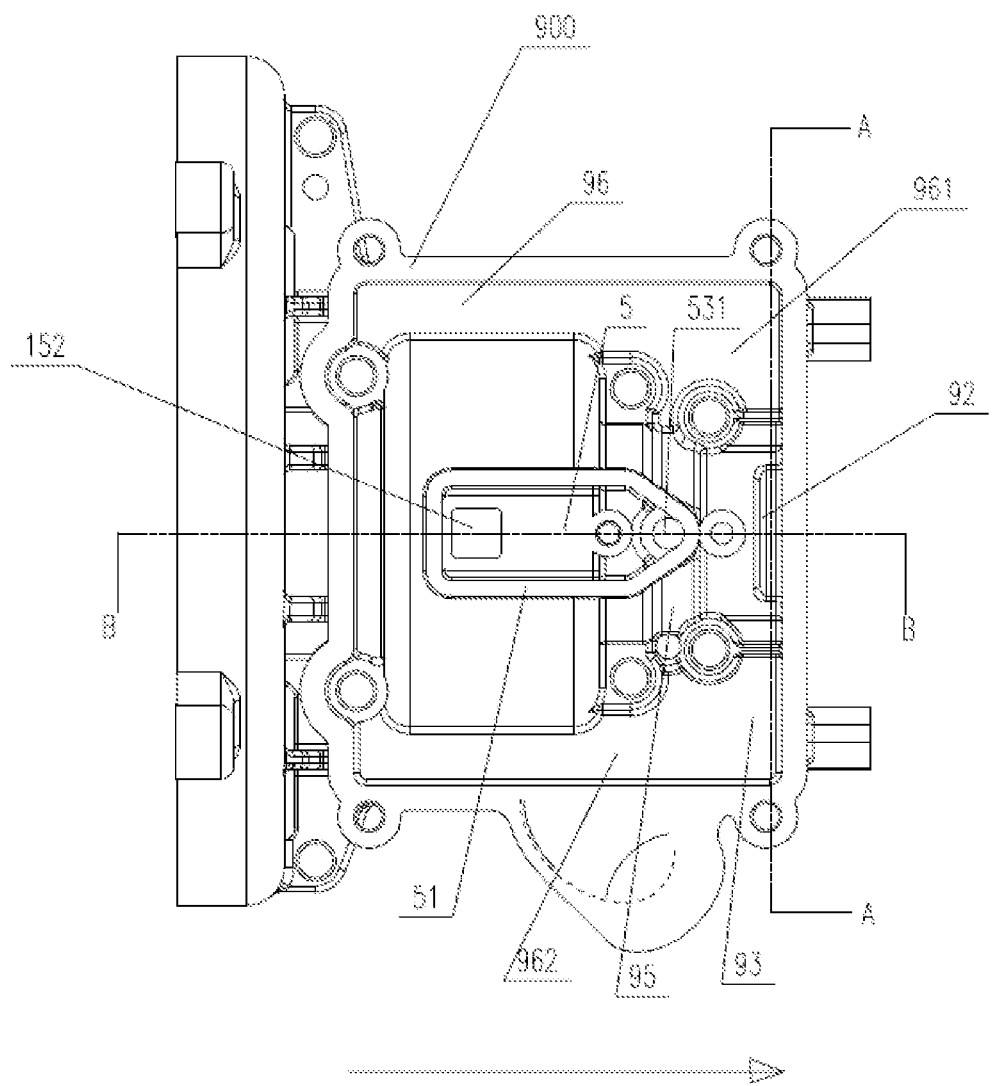
FIG. 7 is a vertical view of a cylinder block of the embodiment of the present invention.

The present invention discloses an oil pan structure. As shown in FIG. 6, FIG. 7, FIG. 12, FIG. 13 and FIG. 14, the oil pan 2 comprises a lower cover 22 and a cylinder block 9. Specifically, a sunk portion 96 is disposed on the first end surface 900 of the cylinder block 9. A cavity chamber formed by buckling the lower cover 22 with the first end surface 900 is namely the oil pan 2. A plurality of arc-shaped grooves 94 are disposed on the second end surface 901 of the cylinder block 9. The arc-shaped grooves are designed for containing a crank shaft 10 (as shown in FIG. 3) and other related parts. The arc-shaped grooves accordingly form arc-shaped bulges 95 on the first end surface 900. The arc-shaped bulges 95 are distributed in the middle of the oil pan 2 along the axial direction of the crank shaft 10. The height of the arc-shaped bulge 95 may differ with different parts. The arc-shaped bulges divide the sunk portion 96 on the first end surface 900 into two parts. When the engine is inverted, i.e. the first end surface 900 is in the lower and the lower cover 22 is in the upper, the lubricating oil is stored in the space formed by the sunk portion 96 and the arc-shaped bulges 95, which are respectively first space 961 and second space 962. The first space and the second space are symmetrical. When the engine works, an oil suction portion 215 sucks the lubricating oil in the first space 961 or in the second space 962. In the prior art, when the lubricating oil level is higher than the height of the arc-shaped bulge 95, the lubricating oil in the first space 961 and in the second space 962 can flow mutually. However, with the reduction of the lubricating oil, the lubricating oil level will become lower and lower. When the lubricating oil level is lower than the lowest arc-shaped bulge, the first space 961 and the second space 962 will be obstructed by the arc-shaped bulges 95, and the lubricating oil cannot flow between the space 961 and 962, causing that partial lubricating oil cannot be utilized. According to the oil pan 2 of the embodiment, a platform 92 is disposed in the sunk portion 96 of the cylinder block 9. The platform 92 is located on the axial direction of the crank shaft 10 and is symmetrical around the crank shaft 10. The platform 92 is a lowest point that communicates the first space 961 with the second space 962. For convenient processing, the platform 92 is located at the tail end of the processing direction of the arc-shaped groove 94 on the cylinder block 9, and is adjacent to a second wall 97. The processing direction of the arc-shaped groove 94 is as shown in FIG. 7. The height of the platform 92 is lower than the height of the arc-shaped groove. Therefore, when the lubricating oil level is lower than the height of the arc-shaped groove, the platform 92 can function as a passage that communicates the first space 961 with the second space 962. In the embodiment, the "height of the arc-shaped groove" and the "height of the platform" refer to the distances from the highest points of the arc-shaped bulge and the platform to a plane on which the first wall 93 of the cylinder block is located. Steps 91 are disposed on the other side of the platform 92 opposite to the platform 92, i.e. the second end surface 901. The top of the step 91 is a plane portion. The plane portion is higher than the lowest end of the arc-shaped groove. The steps 91 prevent the platform 92 from penetrating the cylinder block due to downward sinking during processing. The so-called "platform" in the embodiment is not a part that is limited to surely have a plane. The oil pan structure of the present invention enables the lubricating oil in the first space to be communicated with the lubricating oil in the second space through the platform when the lubricating oil level of the engine is lower than all the arc-shaped bulges, so that the lubricating oil is sufficiently utilized.

The foregoing embodiments are merely preferred embodiments of the present invention, and it is apparent that the present invention is not limited to the foregoing embodiments. Any technical solution without departing from the spirit of the present invention and the scope defined by the claims shall fall within the protection scope of the present invention.

We claim:

1. An engine oil pan, comprising a cylinder block having a plurality of arc-shaped grooves disposed on a second end surface of the cylinder block along the axial direction of a crank shaft to contain the crank shaft;
   a lower cover buckling with a first end surface of the cylinder block to form a cavity chamber, wherein the plurality of arc-shaped grooves are within the cavity chamber;
   the arc-shaped grooves form arc-shaped bulges in a sunk portion on the first end surface of the cylinder block; the arc-shaped bulges divide the sunk portion into a first space and a second space; and
   wherein a platform is disposed inside the sunk portion of the cylinder block; and when the engine is inverted, that is the first end surface is in the lower and the lower cover is in the upper, the lubricating oil is stored in a space formed by the sunk portion and the arc-shaped bulges, which are respectively the first space and the second space, and the height of the platform is lower than the height of the arc-shaped bulges for communicating the lubricating oil between the first space and the second space.

2. The engine oil pan according to claim 1, wherein the second end surface is provided with steps at the platform.

3. The engine oil pan according to claim 2, wherein the steps are higher than the lowest end of the arc-shaped grooves.

4. The engine oil pan according to claim 1, the platform is located at a tail end of the processing direction of the arc-shaped grooves.

5. The engine oil pan according to claim 4, wherein the platform is located on the axial direction of the crank shaft, and is symmetric around the axis of the crank shaft.

6. The engine oil pan according to claim 1, wherein the arc-shaped grooves and the arc-shaped bulges are symmetric around the axis of the crank shaft.

* * * * *